US006274246B1

(12) United States Patent
Eggers et al.

(10) Patent No.: US 6,274,246 B1
(45) Date of Patent: Aug. 14, 2001

(54) FLEXIBLE, POLYAMIDE-CONTAINING MULTI-LAYER FILM HAVING AN IMPROVED THERMO-FORMING CAPACITY DUE TO MOISTENING

(75) Inventors: Holger Eggers, Walsrode; Gregor Kaschel, Bomlitz; Andreas Gasse, Walsrode, all of (DE)

(73) Assignee: Wolff Walsrode Aktiengesellschaft, Walsrode (DE)

( * ) Notice: Subject to any disclaimer, the term of this patent is extended or adjusted under 35 U.S.C. 154(b) by 0 days.

(21) Appl. No.: 09/250,480

(22) Filed: Feb. 12, 1999

(30) Foreign Application Priority Data

Feb. 17, 1998 (DE) ................................................ 198 06 468

(51) Int. Cl.$^7$ ............................ B32B 27/08; B32B 27/34
(52) U.S. Cl. ..................................... 428/474.4; 428/475.8; 428/476.1; 428/476.3; 428/476.9
(58) Field of Search ............................... 428/476.1, 475.8, 428/474.4, 476.3, 476.9

(56) References Cited

U.S. PATENT DOCUMENTS

| 5,945,224 | * | 8/1999 | Gasse | ................................. | 428/474.1 |
| 6,063,417 | * | 5/2000 | Paleari | ................................. | 426/127 |

OTHER PUBLICATIONS

Modern Plastics International, Jan. 1997, p. 109.

* cited by examiner

*Primary Examiner*—Leszek Kiliman
(74) *Attorney, Agent, or Firm*—Joseph C. Gil; James R. Franks

(57) ABSTRACT

A multi-layered laminate suitable for production of thermo-formed packaging is disclosed. The laminate contains a polyamide-containing layer, a sealing layer and optionally an EVOH-containing layer and is characterized in that it contains water in an amount of 0.5 to 2.5 percent.

17 Claims, No Drawings

FLEXIBLE, POLYAMIDE-CONTAINING MULTI-LAYER FILM HAVING AN IMPROVED THERMO-FORMING CAPACITY DUE TO MOISTENING

The present invention relates to a multi-layer sealable film having at least one polyamide-containing layer, optionally one or more EVOH-containing layers, as well as a sealing layer which is at least of unilayer structure, particularly for the production of thermoformed packaging units. The multi-layer film is characterised by a moisture content of at least 0.5% and at most 2.5% with respect to the total weight of the polyamide-containing layers and of the EVOH-containing layers. The multi-layer film according to the invention is distinguished by its improved thermoforming properties, particularly by its improved conversion and by the reduction of striated, irregularly shaped regions, by its very good processability on machines and by its high resistance to perforation. The present invention also comprises the use of said multi-layer films for packaging units, particularly for foodstuffs.

Foodstuffs are frequently packed on thermoforming, filling and sealing machines, which are also simply termed thermoforming machines, in hollow packaging units comprising a thermoformed hollow film and a plain outer film. After thermoforming and the introduction of the filling material into the hollow which is thus formed, the two films are sealed to each other to form a closed container by a heat-sealing operation. The mode of operation of machines such as these and the construction of films which are preferably processed on machines such as these are described, for example, in *The Wiley Encyclopedia of Packaging Technology* (Eds. M. Bakker, D. Eckroth; John Wiley & Sons, 1986) and by Nentwig (Joachim Nentwig: Kunststoff-Folien, Carl Hanser Verlag 1994, Munich).

In many applications it is of crucial importance to the introduction of the filling material that the film is capable of adapting to the hollow contours which are predetermined by the moulding tool, and that the new contour which is thus obtained is retained to the greatest possible extent even after the packaging unit has left the forming station. In contrast, if the film hardly assumes the contours of the tool at all due to an inferior thermoforming capacity, or if the contours subsequently alter, due to shrinkage for instance, it is no longer possible under some circumstances to introduce the filling material into the hollow for reasons of space. A requirement such as this arises, for example, during the packaging of smoked ham, which in many instances is cut into an approximately cubical shape with pronouncedly sharp edges and corners. This results in the necessity of providing a correspondingly sharp-edged hollow, i.e. one which matches the contours of the thermoforming tool as completely as possible. However, if the hollows are of too rounded a shape due to inadequate forming capacity of the film, the ham to be packaged cannot be placed completely in the hollow. If this problem is tackled by increasing the depth of thermoforming using the same hollow contour, the ham does in fact match the hollow, but unwanted folds can be formed in the film situated in the region of the corners of the hollow and base of the hollow, due to the poor correspondence between the contours of the ham and the hollow.

If filling materials are packed which comprise solid constituents, particularly sharp-edged constituents, a further important requirement arises, namely a high resistance to perforation of the film by segments of filling material such as these; this is also hereinafter termed perforation resistance. The packaging of fish is also subject to the requirement of a high resistance to perforation of the packaging film by segments of filling material such as these, particularly if the portion of fish to be packed may contain bones or bone fragments. A suitable method of measuring the perforation resistance is described in connection with the examples.

The design of multi-layer, flexible thermoforming films according to the prior art is explained below.

Unless stated otherwise, the convention employed here is that the abbreviations for plastics according to DIN 7728 or ISO 1043-1987 (E) are used for the description of the polymers contained in the individual layers.

For multi-layer structures, the layer sequence is given by stringing together the abbreviations for the polymers of the corresponding layers or by symbols which are explained elsewhere, separated from each other by double oblique strokes. The side of the sealing layer is always on the right when using this convention. Moreover, only part of the entire layer sequence which makes up the film may be given. In cases such as these, the side of the sealing layer is likewise always on the right, and layers which are not given, or combinations of layers, are recognisable by three dots, . . . Mixtures of different polymers are recognisable by the algebraic sign + and by the combination of the components in brackets ( ). Additional data on percentage compositions may also optionally be given here. Unless stated otherwise, the percentage compositions in such cases are always given in proportions by weight, which are expressed with respect to the total weight of the mixture. For example, the expression . . . //PA//EVOH// . . . //(PE-LD+PE-LLD)//d describes a structure with an unspecified outer layer or an externally situated layer sequence, followed by a layer which substantially consists of polyamide, followed by a layer which substantially consists of an ethylene/vinyl alcohol copolymer (EVOH), followed by an unspecified layer or layer sequence, followed by a layer which comprises a mixture of polyethylene of low density (PE-LD) and an ethylene/α-olefine copolymer (PE-LLD), and with a following layer on the sealing side which is specified in more detail by d.

Melting point data is given below with respect to the value determined by DSC analysis (differential scanning calorimetry analysis) according to ASTM 3418.

Flexible, thermoformable, heat-sealable films usually possess a multi-layer structure and contain one or more layers of polyamide (PA) or mixtures comprising polyamide. PA6, i.e. polycaprolactam, is predominantly employed as the polyamide. However, other types of PA are also used, such as those given in the Table below, particularly for special applications with stringent requirements. The polyamide-containing layers impart a high mechanical stability to the film at room temperature and at customary temperatures of use. They soften on heating and thus enable the film to be thermally deformed to form a hollow.

The term "polyamide" is to be understood in its widest sense, namely to mean polymeric compounds which are linked to each other by an amide group —NH.CO— (see also: Kohan (Ed.): Nylon Plastics Handbook, Hanser Publishers, 1995, Munich). Polyamides can be characterised by the monomers which they contain. A distinction is made between polyamides which are obtained from a monomer by the condensation polymerisation of ω-aminocarboxylic acids or by the polymerisation of lactams thereof to form a polyamide 6 type, and those which are formed from at least one monomer of the diamine and dicarboxylic acid type by condensation polymerisation to produce a polyamide 66 type. A third group, hereinafter termed copolyamides, is understood to comprise those polyamides which contain lactams, diamines and dicarboxylic acids, or which contain more than one diamine and more than one dicarboxylic acid.

Examples of lactams include ε-caprolactam and ε-laurolactam. Examples of diamines include m-xylylenediamine or hexamethylenediamine. Possible dicarboxylic acids include adipic acid, sebacic acid, isophthalic acid, terephthalic acid or dodecanedioic acid.

Polyamides are characterised by numbers which give the number of C atoms in the starting material, or—when there are two components—which give the number of C atoms in the diamine (first number) and in the dicarboxylic acid (second number), or by an abbreviation of the description of the diamine or of the dicarboxylic acid (e.g. PA MXD6 from the diamine m-xylylenediamine and the dicarboxylic acid adipic acid).

| Abbreviation | ω-aminocarboxylic acid or lactams | Diamine | Dicarboxylic acid |
|---|---|---|---|
| PA 6 | ε-caprolactam | — | — |
| PA 11 | 11-aminoundecanoic acid | — | — |
| PA 12 | ε-laurolactam | — | — |
| PA 66 | — | hexamethylenediamine | adipic acid |
| PA 610 | — | hexamethylenediamine | sebacic acid |
| PA 6I | — | hexamethylenediamine | sophthalic acid |
| PA MXD6 | — | m-xylylenediamine | adipic acid |
| PA 6/66 | ε-caprolactam | hexamethylenediamine | adipic acid |
| PA 6/6T | ε-caprolactam | hexamethylenediamine | terephthalic acid |
| PA 6I/6T | — | hexamethylenediamine | isophthalic acid and terephthalic acid |
| PA 6/6I | ε-caprolactam | hexamethylenediamine | isophthalic acid |
| PA 612 | — | hexamethylenediamine | dodecanedioic acid |

Examples of polyamides and monomers thereof

The aforementioned properties of "good conversion" and "high perforation resistance" are also decisively influenced in multi-layer films by the choice of the type of polyamide.

Experience has shown that good conversion can be achieved by the use of polyamides of low crystallinity. In turn, this reduced tendency towards crystallisation can be achieved by means of sterically hindered molecules, via copolymerisation. This applies to purely aliphatic systems such as PA 6/66 for instance, and to copolymers comprising aliphatic elements with aromatic constituents, such as PA 6/6I or PA 6/6T, for example. On the other hand, too high a proportion of aromatic groups results in the embrittlement of the material and impedes thermoforming, likewise due to sterically hindered effects. According to the prior art, however, a low level of crystallinity can also be achieved by the rapid cooling of the polyamide from the molten state. In cases such as these, however, subsequent crystallisation occurs over an extended period following the actual production of the film, due to which the multi-layer film can curl or can exhibit considerable shrinkage, with the consequence of defects in its capacity to lie flat on the roll; these effects are caused by the change in dimensions of the polyamides contained in the film which sets in with subsequent crystallisation.

The perforation resistance increases with the thickness of the polyamide-containing layer. A high perforation resistance can be achieved in two ways. Firstly, it can be obtained via a high flexibility, i.e. by the requirement of a long deformation travel until perforation occurs. Alternatively, however, a high perforation resistance can also be obtained for stiffer and more brittle materials by the requirement of high forces of perforation at relatively slight deformations of the film; this is also known as the perforation travel. A suitable overall measure is the work of perforation, which is calculated by integrating the work of perforation over the perforation travel. Polyamides which have proved to be particularly advantageous in this respect include high molecular weight polyamides and polyamides comprising a high proportion of amide groups. A reduction in crystallinity changes the character of the polyamide from a stiff, brittle material to a soft, flexible substance. With increasing crystallinity, the resistance to perforation is thus characterised by an increasing force of perforation with decreasing perforation travel.

A further important requirement is the homogeneous stretching of the film in the thermoformed regions. In many cases this is not achieved. Instead, a structure which is hereinafter termed a thermoforming anomaly is formed during thermoforming. This structure contains thick and thin regions which are situated directly side by side and which abruptly extend into one another. These thick and thin regions can recur many times one behind another, so that the visual appearance of the packaging is permanently impaired. Experience has shown that this unwanted phenomenon can also be countered by the use of polyamides of low crystallinity.

Although the property spectrum of a polyamide-containing film can in fact be influenced in a targeted manner by the use of copolyamides, the use of copolymerised polyamides such as these is restricted by economic, application technology and production technology factors.

Said copolyamides or mixtures containing them, which enable good conversion or homogeneous thermoforming to be achieved, exhibit a very pronounced tendency to stick, both in the finished film and during the production operation. If a polyamide-containing layer such as this constitutes the outer layer of a multi-layer film, this film has a coefficient of friction, both to itself and to metal, which is considerably higher than that of film outer faces comprising polyamide 6. This is undesirable, for the following reasons.

Directly after leaving the thermoforming machine, the thermoformed containers are frequently conveyed further on chutes or conveyor belts in order to be assembled in a transport package in a next station. A cardboard carton is an example of a transport package such as this. The individual hollow packaging units are typically placed therein, and are disposed side by side and one above another in a close-packed arrangement, manually or automatically. In this operation it is important that the hollow packaging units can be extremely easily displaced in relation to each other, particularly under the effect of pressure. However, if the packaging units exhibit increased friction and thereby exhibit an appreciable resistance to a displacement such as this, the process of packing them into the transport package can be slowed down, and the overall rate of packing can thereby be reduced. Said chutes, on which the hollow packaging units can be transferred from the higher conveyor belt of the thermoforming machine on to a lower conveyor belt leading away from the thermoforming machine, for example, are usually constructed from surface-treated stainless steel. Depending on the inclination and surface roughness of a chute such as this, the hollow packaging units can become jammed there. In situations such as these, the following packaging units accumulate at this point and the packing operation is forcibly interrupted. An essential requirement for a high rate of packing is therefore a high sliding capacity of the outer face of the film which is used, both against itself and against metal.

Another disadvantage of these copolyamides compared with polyamide 6 is their tendency to stick in the warm state.

For example, if a film comprising a copolyamide such as this, or a mixture which contains this copolyamide, is produced by a flat film process, it passes over heated metal rollers at various points in the process. Examples of these include the casting roller, the cooling roller or a roller in the laminating mechanism, for instance. Due to its pronounced tendency to stick to these rollers, the film no longer detaches itself readily. This firstly results in defects in the flatness of the film, and secondly can result in the film seizing to itself and thus in production stoppages.

Apart from this, the use of copolyamides always results in higher materials costs. Consideration therefore has to be given, even for films which do not exhibit the above stickiness problems due to their structure or method of production, to the desired degree of property improvement in relation to the increased materials costs.

In the field of flexible films, the use of polyamide 6 offers a very balanced combination of materials costs, strength, flexibility, sliding behaviour and thermoforming capacity. This material is therefore employed as by far the predominant material for films such as these.

In addition to polyamide-containing layers, sealable films also contain a layer sequence which is denoted hereinafter as the sealing layer. In the simplest case, the sealing layer consists of a single layer. This layer preferably consists of polyolefines, such as polyethylene (PE-LD, PE-HD) or of ethylene/α-olefine copolymers (PE-LLD) for example, which are produced using conventional Ziegler-Natta catalysts or using metallocene catalysts, or consists of polymers derived from olefines, such as ethylene/vinyl acetate copolymers (E/VA), copolymers of ethylene with unsaturated esters (e.g. E/BA, copolymers of ethylene with unsaturated carboxylic acids (e.g. E/AA, E/MAA) and ionomers. Mixtures of said classes of substances are also customary in order to obtain desired combinations of properties.

A multi-layer structure of the sealing layer also forms part of the prior art. Thus the aforementioned substances can be arranged, in order to optimise costs, for instance, in a manner such that the layer situated on the inner face of the film facing the product is distinguished by a particularly early commencement of sealing, and the adjacent layer towards the middle of the film does not melt until higher temperatures have been reached but is more cost-effective for this purpose or exhibits a resistance to melting which enables a sealing layer such as this to be produced as a separate blown film. Polymers which act as bonding agents, which are produced from said groups of substances or which are based on them, such as polymers which are modified by grafting for instance, are optionally also used. Examples of structures such as these include PE-LD//E/VA or PE-LD//E/AA//ionomer layer sequences.

After its conversion into the molten state, the sealing layer makes it possible to form a firm bond with the sealing layer of the outer film. In this manner it is ensured that the packaging is sealed in a manner which is air-tight and mechanically strong. The most important feature of the sealing layer is therefore its ability to melt at considerably lower temperatures than the melting point of the strength-imparting layers of the multi-layer film, i.e. what are usually the polyamide-containing layers.

Films such as these optionally contain further layers in addition, such as layers which impede the permeation of certain gases through the film. One example of this is an oxygen barrier layer comprising an ethylene/vinyl alcohol copolymer (EVOH). The EVOH is preferably inserted by co-extrusion between two PA layers, i.e. with the layer sequence PA//EVOH//PA, and preferably contains 40 to 85 mole % vinyl acetate, at least 90% of which is saponified.

As described in detail above, the sliding capacity of a multi-layer composite such as this is also important as regards its capacity for being processed on machines. The sliding capacity is improved by additives, both for the polyolefinic materials and for polyamides according to the prior art. For this purpose, anti-seizing agents in the form of solid particles are used, which in part project from the outer face of the film and thus reduce the effective area of contact with the adjacent medium. Examples include silica, calcium carbonate, magnesium silicate, aluminium silicate, calcium phosphate, french chalk and the like. Of these substances silica is preferably used. Effective amounts fall within the range from 0.1 to 2% by weight. The average particle size is between 1 and 10 μm, particles of spherical shape being particularly suitable here. In multi-layer structures, these particles are preferably only used in the outer layer.

Other additives which improve the sliding capacity of the film, in cooperation with said solid particles also, include the substances which are usually termed internal lubricants, comprising higher aliphatic amides, higher aliphatic esters, waxes, metal soaps and polydimethylsiloxanes. The effective amount of internal lubricants falls within the range from 0.01 to 3% by weight, preferably 0.02 to 1% by weight. One aliphatic amide which is customarily used for polyolefines is erucic acid amide. Amides based on amines with a higher degree of substitution are usually employed for polyamides. Ethylene-bis-stearylamide is normally used here. Said materials can always only be absorbed within the polymer to a limited extent and therefore over the course of time become deposited on the outer faces after processing to form a film. In this manner, a film which exhibits a sliding capacity is formed there.

The sealing layer and the polyamide-containing layer or polyamide-containing layers, as well as the further layers, are usually bonded to each other, and are optionally bonded together also, by bonding agent layers.

In this respect, the possibility exists of co-extruding all or part of the layers together, i.e. of bringing the polymers of these layers together as streams of melt and causing them to flow in molten form through a common die. An extrudable bonding agent for bonding is necessary for this process. Examples of appropriate bonding agents include prior art polyolefines which are modified with maleic anhydride, or copolymers which contain olefines, such as PE-LD, PE-LLD, PP, E/P or E/VA. However, films of said structure can also be produced by extrusion coating, namely the deposition of the sealing layer in its molten state on a prefabricated polyamide-containing backing film, which is already provided on its face to be coated with the co-extruded bonding agent or with a primer which has been applied after extrusion. If the backing film and the sealing layer are pre-fabricated separately, they can also be joined by the use of a laminating adhesive according to the prior art. Adhesives such as these are usually applied immediately before the application of mixed isocyanates and polyols, which cure to form polyurethanes after application.

However, the prior art also discloses the use of water baths, steam chambers or mist-treatment devices in association with the production of polyamide-containing films. The purpose of systems such as these, which are hereinafter called moisture-conditioning units, is either to effect the enrichment with water of the film passing through by the surrounding medium, whether the latter be superheated steam, saturated steam, mist or liquid water, or is to transfer heat into the film to effect an annealing of the film A combination of both these effects may also be desirable.

The effects of moisture on the physical properties of polyamides have also long been known and have been described. For instance, one comparative review is given by Kohan (Melvin I. Kohan (Ed.): Nylon Plastics Handbook, Hanser Publishers, 1995, Munich).

Thus, in their amorphous regions, polyamides reversibly absorb up to about 10% water (PA 6). In the course of this process, the water molecules form bridges between the amide groups and increase the mobility of the molecular chains in this manner. This effect is manifested in a considerable reduction in the glass transition temperature in the presence of water. Water thus has a plasticising effect in polyamide. At the same time, a change occurs in the mechanical properties, which results in an increase in elongation at rupture, and in a decrease in stiffness (modulus of elasticity), yield stress and tensile strength. A definition of the aforementioned quantities is given DIN EN ISO 527.

The absorption of moisture also has the effect of a dimensional change in polyamides. Thus the density of a polyamide which contains water does in fact increase compared with that of dry polyamide, but a three-dimensional expansion nevertheless occurs due to the absorption of water. However, if heat is also transferred into the film via the water-containing surrounding medium, this can result in subsequent crystallisation, due in particular to the decrease in glass transition temperature in the polyamide which is caused by the moisture, and can thus result in a decrease in the dimensions of the polyamide-containing regions. These conditions are utilised in the prior art in order to counteract the curling of a polyamide-containing multi-layer film.

This effect can also be utilised to eliminate the shrinkage of the film roll, which is due to subsequent crystallisation, or to remove internal stresses. As a result, a film which exhibits improved flatness is always obtained.

The object of the present invention was to provide a flexible, sealable multi-layer film which exhibits both a very good thermoforming capacity and a very good capacity for being processed on machines in installations for film production and on packaging machines.

Very good thermoforming capacity comprises good conversion and homogeneous thermoforming of the material without the formation of striations.

In order to exhibit a good capacity for being processed on machines, the film has to possess a low coefficient of friction on metal and on itself, as well as a high resistance to perforation by the product.

Moreover, it must be possible to process the film without problems in customary production installations.

This object is achieved according to the invention by the provision of a sealable, unstretched multi-layer film for use as a thermoforming film, consisting of one or more polyamide-containing layers (I, I', I", etc.), a layer sequence (II) on the sealing outer face of the film, optionally one or more EVOH-containing layers (III, III', III", etc.) and optionally further layers also, wherein the multi-layer film is characterised in that it has a water content of at least 0.5 and at most 2.5% by weight, with respect to the total weight of the PA- and EVOH-containing layers, before processing to form a hollow.

According to one preferred embodiment, the multi-layer film according to the invention has a water content of at least 0.8 and at most 2.0% by weight, and in a particularly preferred embodiment it has a water content of at least 1.0% and at most 2.0%, with respect to the total weight of the PA- and EVOH-containing layers, before processing to form a hollow.

The water contained in the multi-layer film is supplied to it during or after the production of the film in a device intended for this purpose. The film therefore already contains the proportion of water according to the invention in its rolled-up state as a roll.

Films, which thus include PA-containing multi-layer films for thermoforming applications, generally exist in the form of a roll for transport, for storage and for processing as a packaging material, since it is only possible to handle them in this form. For PA-containing multi-layer films which are in this state, only a very limited exchange of moisture with the environment is possible, due to the sealing layer which is based on polyolefines or copolymers of olefines and which acts as a water vapour barrier. Therefore, the water content which is incorporated in the film during or after production can only change, even during extended storage, in a few layers which are situated on the outside of the roll.

Thus the outer layers of a roll produced from a multi-layer film according to the invention can also have water contents which are lower than those according to the invention when stored for extended periods in a dry environment, and can have water contents higher than those according to the invention when stored for extended periods in a moist environment.

For customary PA-containing multi-layer films according to the prior art, a water content corresponding to that of the multi-layer film according to the invention can likewise temporarily occur in the outer layers of a roll or in unrolled regions. However, even at a relative atmospheric humidity of 40%, the equilibrium value of the water absorption by polyamides such as polyamide 6 or polyamide 66 is significantly greater than the water content of the film according to the invention. In the climatic conditions to which PA-containing multi-layer films according to the prior art are usually exposed in production operations, during transport and in packaging operations, a moisture content corresponding to that of the film according to the invention therefore does not occur as an equilibrium state.

Moreover, in contrast to PA-containing films according to the prior art, the multi-layer film according to the invention has a controlled, increased water content, except for a few outer layers of the film roll, over the entire run length of the roll, which usually contains from several hundred to several thousand meters of film, and therefore exhibits the requisite good thermoforming properties even over this run length. This is a prerequisite for ensuring the required running properties on packaging machines. Therefore, a film according to the invention is provided preferably in rolled-up form having a length of at least 100 meters.

A film which only has the composition of the multi-layer film according to the invention over a short section and/or for a temporary period of time is therefore not suitable for achieving the object which is required of the multi-layer film according to the invention.

In contrast to a film which is only moistened externally due to contact with the atmosphere, the presence of a roll of a multi-layer film according to the invention can be checked, for example, by removing sections from the film roll, before it is processed on a thermoforming machine, from a position within a radial distance of at least 20 mm inside the outer layer of the film roll and at least 50 mm inside the nearest cut edge. If these sections comprise the characterizing water content after a time of contact of 20 seconds at most with the atmosphere which also surrounds them during processing on the thermoforming machine, then the film is a multi-layer film according to the invention.

The polyamide-containing layers (I, I', I", etc.) preferably contain at least 50%, more preferably at least 80% and most preferably at least 90%, by weight, with respect to the weight of the layer concerned, of at least one polyamide of the types comprising polyamide 6, polyamide 10, polyamide 12, polyamide 66, polyamide 610, polyamide 61, polyamide 612, polyamide 6/66, polyamide 6I/6T, polyamide MXD6, polyamide 6/6I, polyamide 6/6T or mixtures thereof. In a particularly preferred form, mixtures are used of said polyamides with at least 80% by weight of polyamide 6, with respect to the total weight of the mixture.

In addition, the polyamide-containing layers of the film according to the invention may contain customary additives such as internal lubricants, pigments or solid fillers of any type. Additives which are particularly suitable for controlling the stiffness and permeability to oxygen of the polyamide-containing layers are solid inorganic or organic particles of a size range less than 1 $\mu$m.

The layer sequence (II), or sealing layer, consists of the polymers which are usually employed as a sealing medium. Examples of these include polyethylene (PE-LD and PE-HD) or polypropylene. In addition, ethylene/$\alpha$-olefine copolymers (PE-LLD) can be used. These can either be produced using conventional Ziegler-Natta catalysts or using metallocene catalysts. In addition, other copolymers of ethylene can be used, such as ethylene/propylene copolymers (E/P), ethylene/vinyl acetate copolymers (E/VA), copolymers of ethylene with unsaturated esters (E/BA), copolymers of ethylene with unsaturated dicarboxylic acids (E/AA, E/MAA), and ionomers.

In order to obtain special properties, the aforementioned polymers which are employed in the sealing layer can also be used in the form of mixtures with each other.

The film according to the invention may also contain a sealing layer of multi-layer structure. Thus the aforementioned substances can be arranged, in order to optimise costs, for instance, in a manner such that the layer situated on the inner face of the film facing the product is distinguished by a particularly early commencement of sealing, and the adjacent layer towards the middle of the film does not melt until higher temperatures have been reached but is more cost-effective for this purpose or exhibits a resistance to melting which enables a sealing layer such as this to be produced as a separate blown film. Polymers which act as bonding agents, which are produced from said groups of substances or which are based on them, such as polymers which are modified with anhydride by grafting for instance, can optionally also be used. Examples of structures such as these include PE-LD//E/VA or PE-LD//E/AA//ionomer layer sequences.

In addition, some or all the layers of the sealing layer can be treated with additives which improve the functionality of the film. Examples include solid inorganic particles which are known as anti-seizing agents, which project from the outer face of the film and improve the sliding behaviour of the film in this manner. Substances which are suitable for this purpose include silica, calcium carbonate, magnesium silicate, aluminium silicate, calcium phosphate, french chalk and the like. Of these substances, silica is preferably used. Effective amounts fall within the range from 0.1 to 2% by weight, preferably 0.1 to 0.8% by weight. The average particle size is between 1 and 10 $\mu$m, preferably between 2 and 5 $\mu$m, particles of spherical shape being particularly suitable here. In multi-layer structures, these particles are preferably only used in the outer layer.

Other additives which improve the sliding capacity of the film, in cooperation with said solid particles also, include the substances which are usually termed internal lubricants, comprising higher aliphatic amides, higher aliphatic esters, waxes, metal soaps and polydimethylsiloxanes. The effective amount of internal lubricant falls within the range from 0.01 to 3% by weight, preferably 0.02 to 1% by weight. The addition of higher aliphatic amides within a range from 0.01 to 0.25% by weight is particularly suitable. One aliphatic amide which is particularly suitable for the polymers used in the sealing layer is erucic acid amide.

In addition to the polyamide-containing layers (I) and the layer sequence (II), the film according to the invention may also contain one or more EVOH-containing layers (III, III', III", etc.), wherein the layers (III, III', III", etc.) preferably contain at least 50% by weight, with respect to the total weight of the respective EVOH-containing layer, of an EVOH comprising at least 85 and at most 40 mole % vinyl acetate, at least 90% of which is saponified. In one particularly preferred form, an EVOH-containing layer (III, III', III", etc.) is placed between two polyamide-containing layers (I, I', I, etc.).

In addition to the layers (I), (II) and optionally (III), the film according to the invention may also contain bonding agent layers (IV). A bonding agent such as this is preferably a laminating adhesive based on polyurethanes or polyester urethanes or is an extrudable bonding agent. Modified polyolefines are preferably used as extrudable bonding agents. In one preferred form, these are polyolefines comprising carboxyl groups, such as polyethylene, polypropylene, ethylene/$\alpha$-olefine copolymers or ethylene-vinyl acetate polymers for example, which are grafted with at least one monomer from the group comprising $\alpha,\beta$-singly unsaturated dicarboxylic acids, such as maleic acid, fumaric acid, itaconic acid or anhydrides, esters, amides and imides thereof. In addition, copolymers which can be used as extrudable bonding agents comprise copolymers of ethylene with $\alpha,\beta$-singly unsaturated dicarboxylic acids, such as acrylic acid, methacrylic acid and/or metal salts thereof with zinc or sodium and/or ($C_1$–$C_4$) alkyl esters thereof, or corresponding graft polymers on polyolefines such as polyethylene, polypropylene or ethylene/$\alpha$-olefine copolymers which are graft polymerised with a monomer of said unsaturated acids. Polyolefines comprising a grafted-on $\alpha,\beta$-singly unsaturated dicarboxylic acid are particularly preferred, especially ethylene/$\alpha$-olefine copolymers which are grafted with maleic anhydride.

The multi-layer film according to the invention enables a film to be produced which can be processed to form a flexible, thermoformed hollow and which is distinguished by a high perforation resistance and by thermoforming properties which result in freedom from striations. It could not have been anticipated that the film additionally exhibits a reduced tendency to stick to itself and to metals.

A fact which was surprising to the inventors is that maintaining a defined range of moisture content compared with customary films results in a considerably improved conversion. Moisture contents which are too high or too low do nor result in this improvement.

The ability to produce the film according to the invention, even as a flat film, has proved to be completely without problems.

The multi-layer film according to the invention therefore enables an improvement in thermoforming properties to be achieved which can otherwise only be achieved at considerably higher material costs. Moreover, it enables a capacity for machine processing to be achieved which cannot be achieved with conventional materials of use. The present film according to the invention is thus accompanied by considerable economic advantages.

As is known, particularly when EVOH-containing films are used, the attainment of good thermoforming properties, especially as regards thermoforming which is free from striations, cannot be ensured by films according to the prior art; for example, see *Modern Plastics International,* January 1997, page 109. The film according to the invention constitutes, for the first time, an EVOH-containing structure which can be thermoformed with a reduced level of striations.

The film according to the invention can be produced in customary installations for the production of multi-layer films.

In this respect, the possibility exists of co-extruding all or part of the layers together, i.e. of bringing the polymers of these layers together as streams of melt and causing them to flow in molten form through a common die. However, the multi-layer film according to the invention can also be produced by extrusion coating, namely by the deposition of the sealing layer in its molten state on a prefabricated polyamide-containing backing film. If the backing film and the sealing layer are pre-fabricated separately, they can also be joined by the use of a laminating adhesive according to the prior art. The entire multi-layer film or partial composites can be produced by blown film technology or by flat film technology.

The entire multi-layer film or a partial composite comprising at least one polyamide-containing layer can be acted upon by the water content according to the invention by the use of a water bath, a steam chamber or a mist-treatment device. Said moisture-conditioning units are preferably integrated in one of said production lines for the multi-layer film or for the partial composite in such a way that the film to be moistened passes through them before it is rolled up.

EXAMPLES

Comparative Example 1

A backing film with the layer sequence PA/EVOH/PA in thicknesses of 22/6/22 µm was bonded, via a laminating adhesive with a layer thickness of 2 µm, with a sealing layer of thickness 100 µm and comprising a mixture of 50% by weight PE-LLD and 50% by weight PE-LD to form a laminate with the structure PA/EVOH/PA//adhesive//(50% PE-LLD+50% PE-LD). The ethylene/butene copolymer (LLDPE) had a density of 919 g/cm$^3$, a melting point of 124° C. and an MFR of 4.4 g/10 min at 190° C. and 2.16 kg and contained an incorporation of 500 ppm erucic acid amide and 1000 ppm silica of average particle size 15 µm; the LDPE, which was free from additives, had a density of 920 g/cm$^3$, a melting point of 108° C. and an MFR of 1 g/10 min at 190° C. and 2.16 kg. The laminating adhesive was a polyurethane-based system. The polyamide used was PA6 with a crystallite melting point of 220° C. and a relative viscosity in 98% sulphuric acid of 3.6. It contained 600 ppm ethylene-bisstearylamide. The EVOH was a copolymer comprising monomeric units of ethylene and of vinyl alcohol, wherein the proportion of ethylene with respect to the entire polymer was 32 mole % and the EVOH had a melting point of 181° C. and an MFR of 1.3 at 210° C. and 2.16 kg. The water content of the film, with respect to the PA and EVOH contained in the film, was 0.25% by weight by contact with the surrounding atmosphere during the production of the film.

Examples 2 to 4 and Comparative Examples 5 to 6

After lamination, the film from comparative example 1 was passed, at various dwell times, through a conditioning chamber containing saturated steam and was subsequently rolled up to form a roll. The films had the water contents given in the Table below, with respect to the PA and EVOH contained in the film.

Comparative Example 7

A backing film comprising the PA6 used in comparative example 1, of thickness 50 µm, was bonded, via the laminating adhesive, to the sealing layer from comparative example 1 to form a laminate. The water content of the film with respect to PA and EVOH contained in the film was 0.3% by weight by contact with the surrounding atmosphere.

Example 8 and Comparative Example 9

The film from comparative example 7 was passed through the chamber from examples 2 to 6 and was subsequently rolled up to form a roll. The films had a water content, with respect to the PA contained in the film, of 0.8% by weight for example 8 and 3.5% by weight for comparative example 9.

Comparative Example 10

A polyamide film of thickness 50 µm was bonded, via the laminating adhesive from comparative example 1, to the sealing layer from comparative example 1 to form a laminate. The polyamide used was a copolyamide of the PA6/66 type with a melting point of 195° C. It contained 600 ppm of a secondary stearamide as an internal lubricant. The laminate had a water content, with respect to the PA6/66 contained in the film, of 0.3% by weight by contact with the surrounding atmosphere.

The following physical and application technology properties of the final samples were measured, as follows:

The frictional properties were determined according to DIN 53 375. The coefficient of friction was measured between film and film and between film and metal. It was always the polyamide outer face of the film in the example which was tested.

The perforation resistance was measured as the force which was necessary to pass a sharp spike, from the sealing side, through a film which was clamped in the manner of a membrane. The requisite travel and the requisite work were also measured. Experience has shown that the work of perforation is best suited for the assessment of the strength in relation to sharp objects in practice. The measurement was made using a Class 1 electronic tensile testing machine according to DIN 51 221 with a testing speed of 100 mm/min. For this purpose, circular samples with a diameter of 80 mm were taken from the film and were clamped in the manner of a membrane in the sample holder, of diameter 50 mm, of the testing device. The testing spike was made of metal and had a diameter of 2 mm. At its tip, it tapered over a length of 5 mm down to a diameter of 1 mm, wherein the front part was rounded, with a radius of 0.5 mm. The work of perforation was obtained by integrating the force acting on the testing spike over the distance which was covered by it until breakthrough of the film occurred. All stages of the tests were performed at 23° C. and 50% relative atmospheric humidity. Sample preparation and carrying out the measurement lasted for about 80 seconds in all cases, so that the original moisture content of the film was maintained as far as possible during the measurement. The tests were each performed on three samples and the results were averaged.

The thermoforming capacity was assessed on a thermoforming machine of the Tiromat 3000 type, supplied by Alfa Laval. The films were processed at a thermoforming temperature of 80° C.; heating was effected by contact with a correspondingly heated heater plate. The heating and moulding times were each 3 seconds. The dimensions of the hollow were 184 mm×114 mm (length×width). The contour length of the hollow $L_M$ between the middle positions of the two longitudinal edges were measured on hollows of this type, which were thermoformed to a depth of 60 mm, by means of a steel measuring tape. With $L_W$ as the corresponding contour length of the hollow-forming tool and $L_0$ as the initial length of the film to be thermoformed, a relative insufficiency of conversion was given as $D=(L_W-L_M)/(L_W-L_0)$.

The contour length of the hollow was measured 60 seconds after it left the thermoforming station, i.e. at a time at which filling material could typically be inserted in the hollow.

In addition, the hollows which were thermoformed using a tool depth of 60 mm were assessed qualitatively as regards the occurrence of thermoforming anomalies. The symbols used here have the following meanings:

+: no striations, or striations which are only slightly discernible, in a region of the hollow o: clearly identifiable striations in a region of the hollow −: striations resulting in considerable visual impairment in a region of the hollow The machine-processing capacity of the polyamide film during extrusion was likewise assessed qualitatively. The symbols used here have the following meanings:

++: no discernible sticking to rollers

+: slight sticking to rollers o: considerable sticking to rollers

−: sticking to rollers which was not acceptable for processing.

The results are summarised in the following table:

Properties of PA- and EVOH-containing films according to the invention and of comparative samples

|  |  | Example or comparative example | | | |
|---|---|---|---|---|---|
| | Units | Comp. 7 | Ex. 8 | Comp. 9 | Comp. 10 |
| Water content with respect to PA and EVOH | % by weight | 0.3 | 0.8 | 3.5 | 0.3 |
| Insufficiency of conversion D | % | 12.9 | 8.8 | 17.1 | 8.6 |
| Work of perforation | N cm | 1.37 | 2.8 | 3.1 | 1.8 |
| Coefficient of static friction; film/film | — | 0.25 | 0.24 | 0.25 | 0.45 |
| Coefficient of static friction; film/metal | — | 0.18 | 0.19 | 0.19 | 0.39 |
| Degree of thermoforming anomalies | Note | − | + | + | + |
| Tendency to stick to rollers | Note | ++ | ++ | ++ | −− |

Properties of PA-containing films according to the invention and of comparative samples There was a clear optimum in the conversion of the films of the examples; this was in a range between 0.5 and 2.5 percent by weight of water with respect to the total weight of the PA- and EVOH-containing layers. Homogeneous thermoforming, good sliding properties and a high perforation resistance were also achieved within this range. At lower water contents the conversion, thermoforming anomalies and perforation resistance were too unfavourable. High water contents did in fact result in high perforation resistances and thermoforming with reduced striations, but also resulted in low conversions. The differences in conversions were even significant for the geometry of the hollow which was selected and for the measuring procedure selected, which could be made objective. The conversion deficits in the longitudinal and transverse directions overlapped in the corners of the hollows, so that the result here was differences in conversions which were even more conspicuous, which thus resulted in the problems described above when inserting the filling material. An objective measurement in this region can only be made with difficulty, however.

|  |  | Example 1 or comparative example | | | | | |
|---|---|---|---|---|---|---|---|
| Feature | Units | Comp. 1 | Ex. 2 | Ex. 3 | Ex. 4 | Comp. 5 | Comp. 6 |
| Water content with respect to PA and EVOH | % by weight | 0.25 | 0.7 | 1.4 | 2.5 | 3.4 | 9.5 |
| Insufficiency of conversion D | % | 14.0 | 7.6 | 5.7 | 8.6 | 11.0 | 16.0 |
| Work of perforation | N cm | 1.8 | 2.4 | 2.9 | 3.1 | 3.5 | 3.8 |
| Coefficient of static friction film/film | — | 0.21 | 0.23 | 0.22 | 0.22 | 0.24 | 0.25 |
| Coefficient of static friction film/metal | — | 0.16 | 0.17 | 0.18 | 0.18 | 0.20 | 0.20 |
| Degree of thermo forming anomalies | Note | − | + | + | + | + | + |
| Tendency to stick to rollers | Note | ++ | ++ | ++ | ++ | ++ | ++ |

What is claimed is:

1. A multi-layered laminate having an outer face comprising, at least one polyamide-containing layer, a sealing layer superposed over said polyamide-containing layer and defining said outer face of said multi-layered laminate, and optionally at least one EVOH-containing layer, said EVOH-containing layer being interposed between two polyamide-containing layers, wherein said multi-layered laminate has a combined weight of said polyamide-containing layer and EVOH-containing layer, and contains water in an amount of at least 0.5 and at most 2.5 percent relative to the combined weight of said polyamide-containing layer and EVOH-containing layer.

2. The multi-layered laminate of claim 1 wherein the amount of water contained in said multi-layered laminate is at least 0.8 and at most 2.0 percent relative to the combined weight of said polyamide-containing layer and EVOH-containing layer.

3. The multi-layered laminate of claim 1 wherein the amount of water contained in said multi-layered laminate is at least 1.0 and at most 2.0 percent relative to the combined weight of said polyamide-containing layer and EVOH-containing layer.

4. The multi-layered laminate of claim 1 having a rolled-up form with a length of at least 100 meters.

5. The multi-layered laminate of claim 1 wherein said polyamide-containing layer comprises at least 50% relative to its weight of at least one member selected from the group consisting of polyamide 6, polyamide 10, polyamide 12, polyamide 66, polyamide 610, polyamide 6I, polyamide 6/12, polyamide 6/66, polyamide 6I/6T, polyamide MXD6, polyamide 6/6I and polyamide 6/6T.

6. The multi-layered laminate of claim 1 wherein said polyamide-containing layer comprises at least 80% relative to its weight of at least one member selected from the group consisting of polyamide 6, polyamide 10, polyamide 12, polyamide 66, polyamide 610, polyamide 6I, polyamide 6/12, polyamide 6/66, polyamide 6I/6T, polyamide MXD6, polyamide 6/6I and polyamide 6/6T.

7. The multi-layered laminate of claim 1 wherein said polyamide-containing layer comprises at least 80% relative to its weight of polyamide 6.

8. The multi-layered laminate of claim 1 wherein said polyamide-containing layer consists of polyamide 6.

9. The multi-layered laminate of claim 1 wherein said EVOH-containing layer is present in said multi-layered laminate.

10. The multi-layered laminate of claim 9 wherein said EVOH-containing layer comprises ethylene/vinyl alcohol copolymer in an amount of at least 50% relative to the weight of said layer.

11. The multi-layered laminate of claim 1 wherein said sealing layer comprises at least one member selected from the group consisting of polyethylene and ethylene copolymers.

12. The multi-layered laminate of claim 1 further comprising a bonding agent layer interposed between said polyamide-containing layer and said sealing layer.

13. The multi-layered laminate of claim 12 wherein said bonding agent layer comprises at least one member selected from the group consisting of polyolefin, ethylene/vinyl acetate copolymer grafted with at least one monomer selected from the group consisting of $\alpha,\beta$-singly unsaturated dicarboxylic acid, and the anhydride, ester, amide and imide of said acid and a copolymer of ethylene with at least one member selected from the group consisting of $\alpha,\beta$ singly unsaturated dicarboxylic acid zinc salt of $\alpha,\beta$ singly unsaturated dicarboxylic acid and sodium salt of $\alpha,\beta$ singly unsaturated dicarboxylic acid.

14. The multi-layered laminate of claim 13 wherein said $\alpha,\beta$-singly unsaturated dicarboxylic acid is selected from the group consisting of maleic acid, fumaric acid and itaconic acid.

15. The multi-layered laminate of claim 12 wherein said bonding agent layer comprises at least one member selected from the group consisting of polyurethane and polyacrylate.

16. A packaging material comprising the multi-layered laminate of claim 1.

17. A packaging material for foodstuffs comprising the multi-layered laminate of claim 1.

* * * * *